FIG. 1.

INVENTOR.
R. E. PAGE

FIG. 2.

Jan. 7, 1947.    R. E. PAGE    2,413,884
MANUALLY CONTROLLED RECORD PUNCHING MACHINE
Filed July 9, 1945    8 Sheets-Sheet 3

FIG. 3.

INVENTOR.
R. E. PAGE
BY

FIG. 4.

Jan. 7, 1947.   R. E. PAGE   2,413,884
MANUALLY CONTROLLED RECORD PUNCHING MACHINE
Filed July 9, 1945   8 Sheets-Sheet 5

FIG. 5.

INVENTOR.
R. E. PAGE
BY

Patented Jan. 7, 1947

2,413,884

UNITED STATES PATENT OFFICE 2,413,884

MANUALLY CONTROLLED RECORD PUNCHING MACHINE

Ralph E. Page, Poughkeepsie, N. Y., assignor to International Business Machines Corporation, New York, N. Y., a corporation of New York Application July 9, 1945, Serial No. 603,852

13 Claims. (Cl. 164—112)

This invention relates to punching machines which are capable of perforating records, such as accounting machine controlling cards to represent data pertaining to a sale or transaction. More specifically the invention relates to machines of the manually controlled type, having provisions to enable the operator to predetermine the numerical data to be punched upon the card, so that for each sale or transaction a card will be punched which is subsequently utilized to control a statistical or accounting machine of the type now on the market.

The present machine has been specifically designed for use in connection with post offices, primarily in the departments which issue money orders, although it is generally applicable for use in stores and other establishments.

The main portion of the card has recorded thereon the amount of the money order when used for this purpose and is recorded both by punching the card and by printing the same amount thereon.

The main portion of the card has blank lines reserved for writing the name and address of the payee, that is, the person who is to receive the money order. The recording of the amount on the main portion of the card and the name of the payee provides what is generally known as "card check." When it is issued by the post office it is known as a "money order." Such card check or money order is handled just like any other check and goes through the banking procedure in the same manner. The punching of the amounts on the money orders or card checks enables accounting operations to be automatically performed under control of the perforated cards so as to totalize amounts of money orders issued. The punching of the amounts on the check insures an unchangeable designation of the amount, preventing fraudulent transactions by alteration of the recorded amounts to increase the value.

The machine also includes a supplemental feature of printing the same amount on two stub portions of the card check, one of which is retained by the department issuing the money order and the other by the person purchasing the money order. Two receipt portions also recorded by printing fulfill the requirement of the post office department but may be used differently if the present machine is used in connection with other forms of transaction.

It is, therefore, the main object of the present invention to devise an improved manually controlled record punching machine which is capable of punching record cards inserted in the machine and also record by printing the same values at one or more places on the card.

A more specific object of the invention relates particularly to the construction of the machine which is designed to fulfill the characteristic of simplicity in construction, ease of operation, and to design such mechanisms so that they operate efficiently so as to minimize or eliminate the service requirements usually made in connection with such forms of machine.

Another feature of the invention relates to the provision of manually controlled settable slides and a system of interconnection between such slides and the three groups of type printing members and also between such slides and a group of punch slides which enable the setting of the punch slides and the type members to the same digit position without the possibility of recording inconsistent values on the same record.

Another object of the invention is to provide a simple means of presenting a card to the punching and printing mechanisms, which objective is attained by the provision of a card carriage on which the card may be manually placed and inserted in the machine and subsequently withdrawn after the recording operation.

A still further object of the invention is to incorporate an interlocking system which insures the proper performance by the operator by requiring that a card be placed upon the carriage and that the carriage is within the machine at the recording position before the machine may be operated, and which prevents setting up of an amount greater than the maximum amount which may be set up in the machine.

A further object of the invention is the provision of means to prevent operation of the machine when more than one card is placed on the card carriage.

The interlocking system which prevents the operation of the machine until a card has been placed on the carriage is controlled by the card itself and when the latter is placed upon the card carriage it operates a lever which enables the shifting of the card carriage within the machine to its limit position. The positioning of more than one card on the carriage does not allow the cards to be placed on the carriage in such a position that said lever is operated. In the absence of a card on the card carriage or the positioning of more than one card thereon, the carriage cannot be moved to the limit position and the normal locking mechanism is maintained. However, when a single card is on the carriage the lever is operated and the carriage can be moved to the limit position in the machine to disable the locking mechanism, and the machine can now be operated.

At the present time the maximum amount for which a money order can be issued is $100.00. To limit the recording and entering of this amount in the machine a supplemental interlocking system which is simple and effective in operation prevents setting up such slides to digit positions which exceed this amount.

To prevent the recording on a card check until an amount has been set up in the machine the units denominational slide controls a locking mechanism for the operating mechanism of the machine which prevents card punching and recording operation until such unit slide is set to any digit position 0–9.

Another feature of the invention relates to the provision of an accumulator which totalizes the amounts entered in the machine and also an item counter of the Veeder type which counts operation of the main operating mechanism which, of course, should conform to the number of money orders or card checks recorded.

While the invention has been shown in connection with a specific form of machine and designed for a special use, it is to be understood that this is merely by way of example, and other machines may be constructed to include some or all of the features of the present machine, and may be used for various types of sales and transactions, and in different embodiments.

Other features of the invention may be used in connection with different forms of manually controlled recording machines and the present embodiment is to be considered merely as illustrative and not restrictive.

Other objects of the invention will be pointed out in the following description and claims and illustrated in the accompanying drawings, which disclose, by way of example, the principle of the invention and the best mode, which has been contemplated, of applying that principle.

The setting up of the amounts for printing data at three places A, B, C (Fig. 6) on the card and for also punching the same data at another place G on the same card is under control of five manually settable slides; 20, 21, 22, 23 and 24 for setting up of amounts to and including one hundred dollars. Each slide 20 to 24 has attached thereto a manipulative member or finger piece 25 (see Fig. 2) which is movable in a slot over an index scale 26 (see Fig. 4). The sign * indicates the normal setting of the manipulative members and 0–9 indicate the digit settings. Integral with each finger piece 25 is an indicator plate 18 bearing the indicia *, 0–9 which are visible through an aperture 19 in the index scale 26 to confirm and display the digit setting of each slide. Slides 20 to 24 may be slidably mounted in the main side frame plates 10, 11 in any suitable manner, preferably by a guide rod 27 (Fig. 2) cooperating with an elongated slot 28 of each slide and also at the rear end of the machine by a slotted guide bar 29. The digit setting of each slide 20 to 24 is maintained by means of an aligning pawl 30 (Fig. 2) which is urged by a spring 31 to engage interdental spaces 32 formed in the upper edge of each setting slide. Such pawl 30 impositively aligns each slide in its digit position, nevertheless enabling the setting of the slide from one digit position to the other as the amounts entered in the machine are changed.

Figure 2:
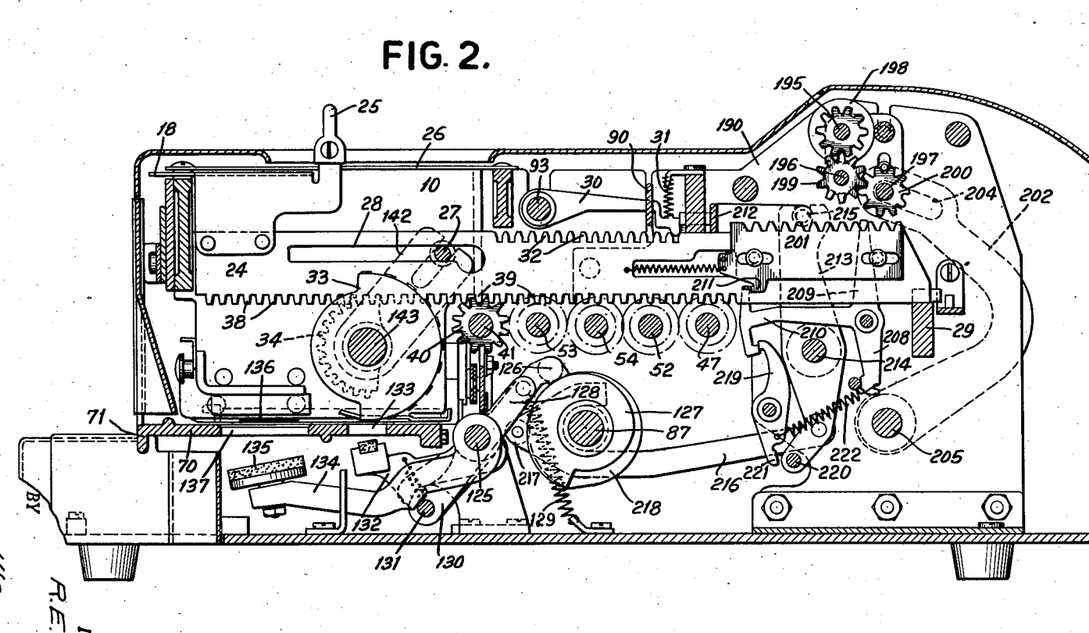
Fig. 2 is a sectional view taken on the line 2—2 of Fig. 4.

The means for printing the amounts comprises for each order a segment member 33 (see Fig. 2) carrying raised printing type and having attached thereto a gear segment 34. All of the printing segments are alike and they are disposed in three groups; 35, 36 and 37 (see Fig. 3). Each group of type members consists of five segments 33, corresponding to the five denominational orders of the amounts set up in the machine and therefore, for each denominational order, three printing segments are used. That is to say, each slide 20–24 is adapted when set to any digit position to set three printing segments like the segment 33 to corresponding digit positions, and which printing segments are in the three groups 35, 36 and 37. To effect concurrent setting of printing segments of the same denominational orders, a cross-over system comprising the usual jack shaft and pinions is provided. In view of the fact that such inter-connecting system is well known, it is thought that a detailed description of the complete system is unnecessary and will be generally explained in connection with a part of such system. The slide 24 for setting up the tens of thousands denominational order amount is shown in Fig. 2 and is equipped at its lower edge with rack teeth 38 directly meshing with the gear segment 34 of the printing segment 33 in the type member group 37. The rack teeth 39 (Fig. 2) mesh with a pinion 40 secured to a cross-over shaft 41 and said shaft also carries two pinions similar to pinion 40, one of which meshes with a rack slide 42 (Fig. 4), which is adapted to adjust the type segment 43 (Fig. 3) of the tens of thousands denominational order of the group 36. Another pinion like pinion 40 attached to shaft 41 meshes with the rack teeth of a slide 44 (see Fig. 4) which adjusts the type segment 45 (Fig. 3) of the tens of thousands denominational order of the type segment group 35. Summarizing, the setting of the slide 24 for the tens of thousands denominational order will adjust three type segments 33, 43, 45 to the same digit position in the three groups.

The slide 23 for setting the thousands denominational order amount has a direct gear connection with the type segment 46 (Fig. 3) for printing the thousands denominational order digit in the type member group 37. Slide 23 also has similar gear connections previously described to rock a cross-over shaft 47 (Fig. 2) and said cross-over shaft carries pinions similar to pinion 40 for adjusting slides 48 and 49 (see Fig. 4), for setting type segments 50 and 51 (Fig. 3) of the thousands denominational order of the type groups 36 and 35, respectively. Other similar connections are made from the remaining manually settable slides 20, 21 and 22 for adjusting the type segments of the units, tens and hundreds denominational order in the three type groups 35, 36 and 37. In Fig. 2, reference numerals 52, 53 and 54 designate the cross-over shafts related to the units, tens and hundreds denominational orders.

Figure 4:
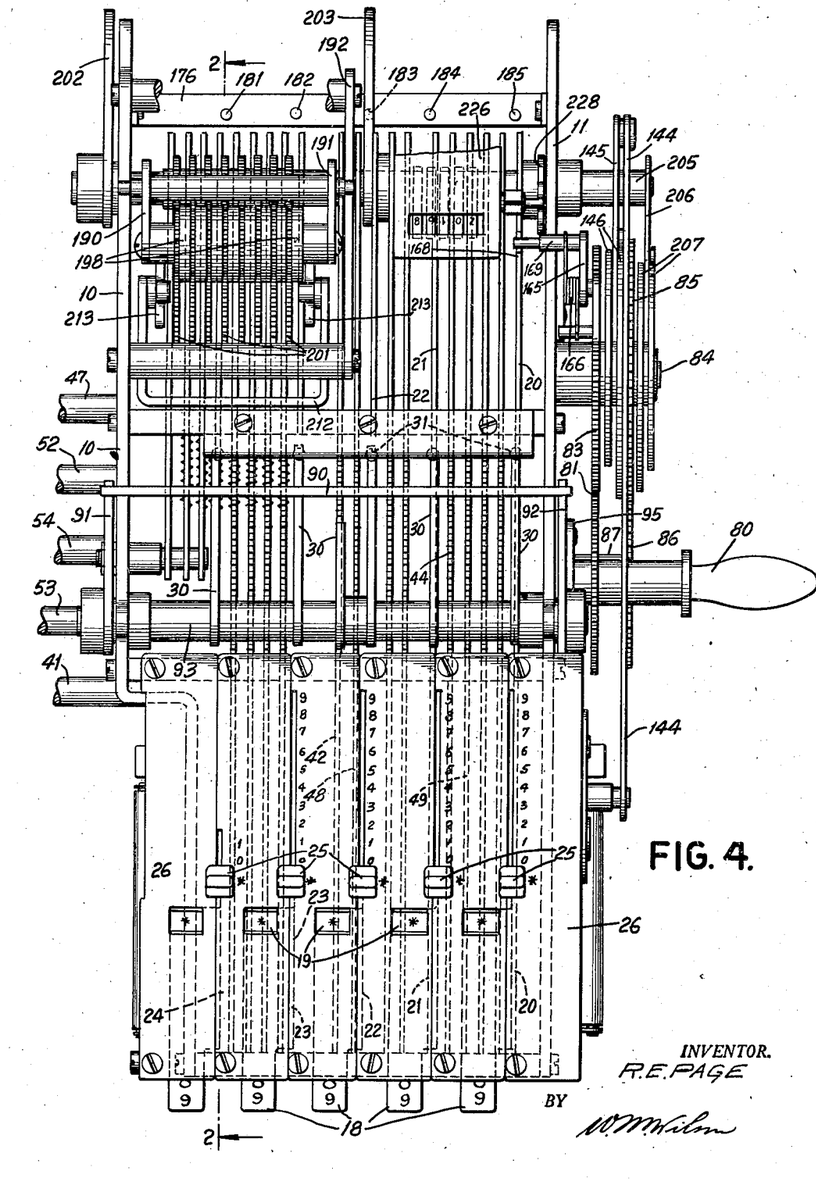
Fig. 4 is a plan view of a portion of the machine.
Figure 5:
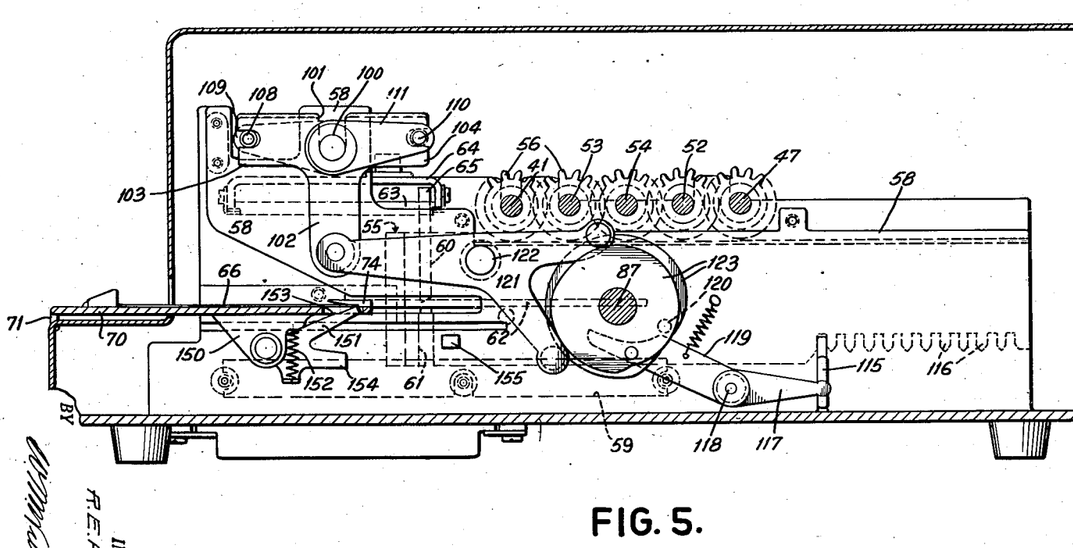
Fig. 5 is a sectional view taken along the line 5—5 of Fig. 3.

In addition to the aforedescribed printing, the machine also includes a card punching mechanism, the punching slides of which are set up concurrently when manipulative members 25 are adjusted to the desired digit positions. To this end, as shown in Fig. 4 the cross-over jack shafts 41, 53, 54, 52, 47 extend to the left as the front of the machine is observed, to adjust five punch slides 55 of the punching section of the machine (Figs. 3 and 5) for setting up the five denominational orders. A pinion 56 attached to each cross-over shaft meshes with the rack teeth at the upper edges of the related punch slide 55. The punch slides are slidably mounted between frame plates 57 and 58 and between such frame plates there is provided a series of guide plates 59, (Fig. 3) between which the lower edges of the punch slides 55 are positioned so as to suitably guide them in their differential positions. The length of the guides 59 is shown in Fig. 5 from which it is observed that they effectively guide the punch slides 55 in all the differential positions of the latter. Each rack slide consists of an upper portion bored to receive a punch pin 60 (Fig. 5) and a lower portion bored to form a punch die 61. It will be seen that such portions are separated by a card receiving slot 62. Each punch pin has an integral overlapping head portion 65 overlying guide bar 63 of the punch depressing mechanism to be described in detail hereinafter. It will be seen that while the head portion 65 overlies related guide bar 63 the head portion 65 is always below a punch pin depressor plate 64 in any digit position of the punch slide.

Figure 6:
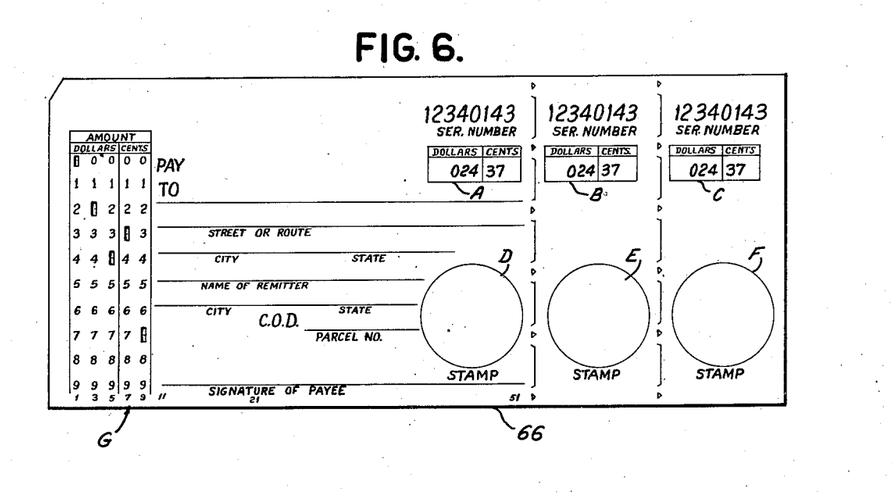
Fig. 6 is a representation of a form of record which is punched and printed by the present machine.

When a punch slide is moved from the * position to the zero position its punch pin 60 will perforate the zero index point position of the card 66 shown in Fig. 6. Through the cross-over jack shaft, gear and rack connections just described, the positioning of a manipulative member to the rear of the machine for setting up the digits 0, 1, 2, 3–9 in the named order will cause the related punch slide to be positioned forwardly, so that in the extreme forward position of a punch slide the punch pin 60 will be positioned to punch the 9 index point position, and intermediate digit positions of the manipulative member 25 will correspondingly provide intermediate positions of the punch pin 60 to punch index point positions corresponding to the digit setting of the manipulative member 25. The punch pins 60 have a column spacing which effects punching of alternate columns 1, 3, 5, 7, 9 of the form of record card shown herein and in Patent No. 1,772,492, issued to C. D. Lake, granted August 12, 1930.

The card carriage on which the card 66 (Fig. 6) is positioned within the machine for card punching is shown in Figs. 1, 2, 3 and 5.

Figure 1:
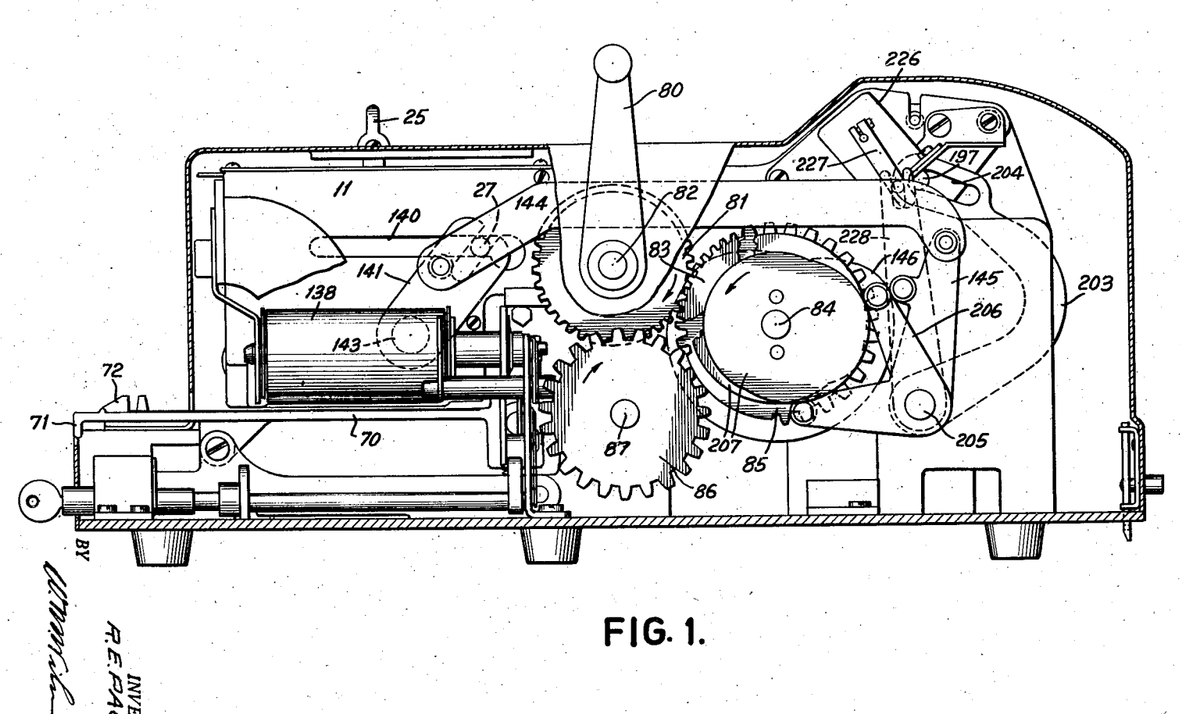
Fig. 1 is a view in elevation of the right hand end of the machine, the cabinet having been cut away to show the interior parts.
Figure 3:
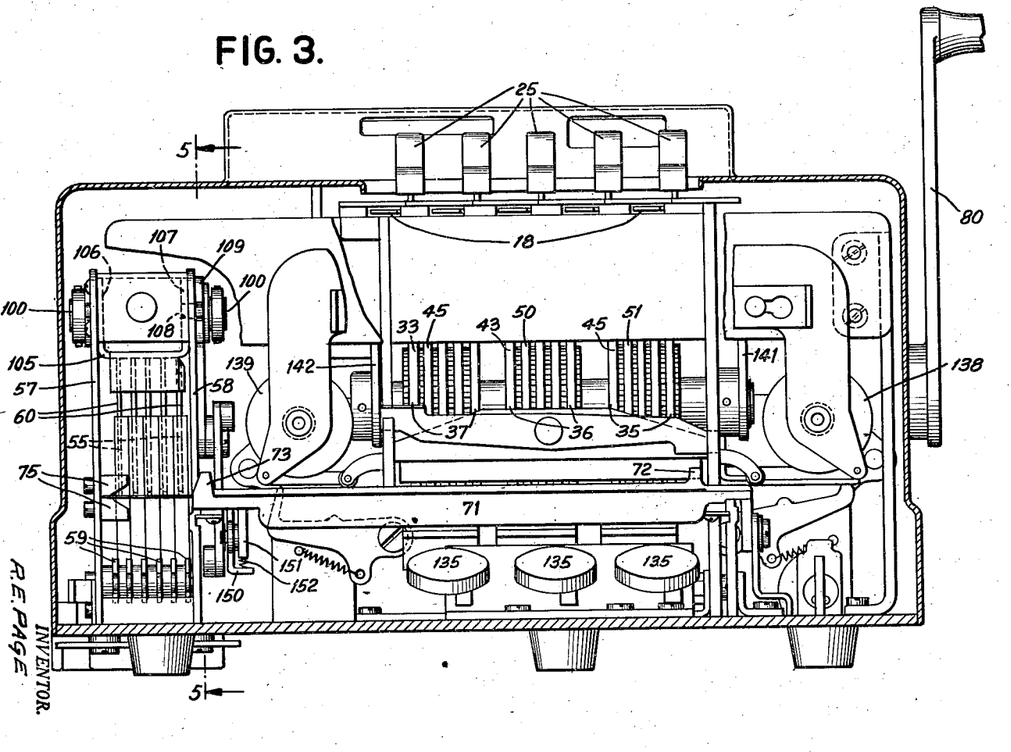
Fig. 3 is an elevational view of the front of the machine, the cabinet cover having been cut to show the interior parts.

Figs. 1, 3 and 5 show the outward card receiving position of the card receiving carriage and Fig. 2 shows the inward recording position of the carriage for correlating the card 66 to punching and printing position. The card receiving carriage consists of a flat plate 70 suitably guided for reciprocating movement in any suitable manner. Integral with the card carriage plate 70 is a downwardly-bent portion or apron 71 providing a member to be grasped by the fingers for moving the carriage inwardly and restoring it outwardly. To properly locate the card on the carriage the forward right hand corner of the plate has attached thereto a guide block 72 which is shouldered so as to receive the right forward corner of the card 66. The left end of the card carriage has also secured thereto a guide block 73 (Fig. 3) against which the forward edge of the card is positioned. Also at the left end of the card receiving carriage but inwardly there is secured a guide block 74 (see Fig. 5), receiving the rear edge of the card, said block 74 being cut diagonally so as to guide the card downwardly flat against the card receiving plate 70 and to operate a card lever to be subsequently described.

In view of the fact that the width of the card receiving plate 70 is not coextensive with the width of the card 66, the left hand portion of the card 66 to be punched extends to the left thereof so that such overhanging portion fits in the card receiving slots 62 of the punch slides 55. To further suitably support this overhanging portion attached to the punch frame plate 57 is a pair of spaced guide blocks 75 (Fig. 3) which receive the extreme left marginal edge of the card. When the card carriage is in the outward position the operator manually places the card on the card plate 70 so that it is aligned on the plate by the aforementioned guide blocks and members. The operator then grasps the apron 71 and moves the card inwardly to the position shown in Fig. 2. In such position the three groups of printing members will be correlated with the card to print on the card on the lines A, B, C (see Fig. 6) and at the different digit positions of the punch slide the pins 60 will be correlated with the index point positions corresponding to the amount to be punched on the card, printed, and entered in the machine. After the operation of the main operating mechanism of the machine the operator again grasps the apron 71 to move the punch carriage outwardly so that the punched and printed card can be removed therefrom for its intended use.

The means for operating the operating mechanisms of the machine in the required sequence is effected by manual means consisting herein of a crank handle 80 operable outside of the machine cabinet. The hub of said handle is fixed to a driving gear 81 (see Figs. 1, 4 and 12) loosely mounted upon a stud shaft 82. To operate the machine to effect printing and card punching, said handle is rotated one complete revolution.

Gear 81 meshes with a gear 83 so that the latter and other elements attached thereto, such as cams and gears, are also rotated one complete revolution. Gear 83 is loose upon a stud shaft 84. Rotatable with gear 83 is a gear 85 mutilated to the extent that the smaller gear 86 it drives will be rotated one complete revolution by the time gear 83, and the crank handle 80, will have rotated ⅚ of a revolution (or 300°). During the remaining ⅙ of a revolution of the crank handle 80 and gear 83, gear 86 will be stationary, this for reasons hereinafter disclosed. Gear 86 is attached to end of a shaft 87 which carries cams for operating printing platens, ribbon feed, punch depressing mechanism etc., and may therefore be considered as the cam shaft.

The power for operating the machine may, of course, be derived by a motor but herein a crank handle 80 is shown for simplicity and said handle is rotated after the card carriage has been pushed inwardly in the machine and the amounts to be punched and printed have been set up on the machine.

As will be subsequently described, an interlocking system insures that before said crank handle can be operated a card and only one card has been placed in the carriage; the latter has been pushed inwardly in the machine; and the units order manipulative device has been positioned to some digit position 0–9.

Figure 7:
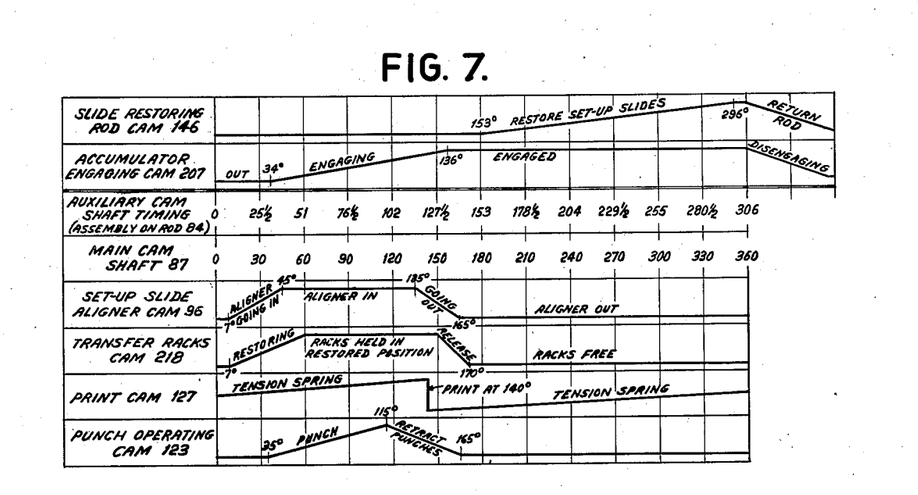
Fig. 7 is a timing diagram showing the sequential operations of the mechanisms of the machine.

With the assumption that all of such preliminary operations have been carried out, the crank handle 80 is rotated to effect the operation of certain operating mechanisms of the machine in the sequence shown in the timing diagram of Fig. 7. During the initial operation of the operating mechanism of the machine the rack slides are locked in their positions of adjustment to prevent the operator from intentionally or accidentally moving any out of their digit positions. Such locking is effected by pawls 30 and a positive lock bail 90 for the related rack slides which will, of course, lock all of the other rack slides movable therewith. Although this aligning and locking mechanism will also lock the punch rack slides, the latter have a separate aligning and locking mechanism to be subsequently described.

Figure 8:
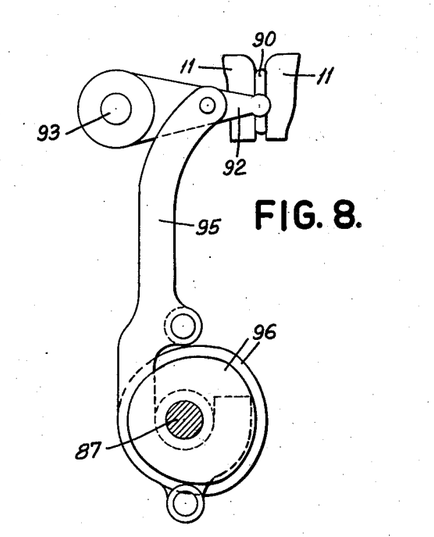
Fig. 8 is a detail view showing the operating mechanism for the slide aligning and locking mechanism.

Referring to Figs. 2 and 4, a transverse bail plate 90 is slidably guided in slots in side frames 10 and 11 and said bail is carried by arms 91, 92 secured to a rock shaft 93. Said bail plate 90 has slots in which fit the extremities of the aligning pawls 30 and in the normal position of the bail plate 90 said aligning pawls 30 may freely move in the slots as they are reciprocated to perform their aligning function. Connected to the arm 92 is a pitman 95 (see Fig. 8) and said pitman carries at its lower end follower rollers cooperating with complementary cams 96 rotated by the cam shaft 87. The cams are of such formation, as shown in the timing diagram of Fig. 7, that at the initial operation of the machine the cams will rock the arms 91, 92 and the shaft 93 to move the bail 90 downwardly, thus holding or rocking all pawls 30 to such a position that the settable slides will be aligned and locked in such position. The locking operation is continued during the time that the punching and printing operations of the machine are effected and thereafter the cams 96 are operative to then elevate bail plate 90 upwardly to normal position so that the slides are again impositively aligned. During the time that the bail 90 is in restored position, the slides will be restored to normal position by means to be subsequently described.

For aligning the punch slides, there is an aligning and locking bail 115 (Fig. 5) slidably mounted in the side plates 57, 58 of the punch unit and adapted to cooperate with the inter-dental teeth 116 of the punch slides 55. For reciprocating the aligning and locking bail 115 there is provided a pair of arms 117 secured to a rock shaft 118 and said rock shaft carries at its extremity adjacent the side plate 58 a spring urged arm 119. A stud 120 carried by an operating cam 123 secured to the cam shaft 87 actuates the arm 119. During the initial operation of the main operating mechanism stud 120 rocks arm 119 and shaft 118 so that through arms 117 the aligning and locking plate 115 is elevated to cooperate with one of the aligning teeth 116, dependent upon the position of the related punch slide 55. This locking relationship is maintained during the time that the card punching operation is effected by means now to be described.

The following described mechanism is utilized to depress the punches to punch the card.

A rock shaft 100 (Figs. 3 and 5) is carried by the side plates 57 and 58 of the punch unit. An actuating plate 102 is provided with a forward arm portion 103 and a rear arm portion 104 and is provided centrally with a guide slot 101 cooperating with the rock shaft 100. The punch operating frame includes a bottom plate 105 to which the punch plate 64 is secured, (Fig. 3) and two integral side plates 106 and 107. A stud 108 is received by an open slot in the forward arm portion 103 and a similar slot in the side plate 107, said stud 108 being carried by an arm 109 loose on the rock shaft 100. Similarly the rear arm 104 of the actuating plate 102 receives a stud 110 carried by an arm 111 secured to rock shaft 100, said stud also being received by a slot in the side plate 107. The side plates 106 and 107 also have guide slots received by the rock shaft 100. Obviously, when the actuating plate 102 is moved downwardly the interconnection effected by the studs 108 and 110 will cause the side plate 107 to be moved downwardly with equal force at both extremities, thus moving the bottom plate 105 and punch plate 64 similarly. To insure an equal depression of the side plate 106 of the punch operating frame, preferably through a duplicate of such interconnections the side plate 106 is also given an equal depressing movement when the actuating plate 102 is moved downwardly.

To effect such movement of the actuating plate 102, it will be seen that it is connected by a pin (Fig. 5) to a double arm 121 pivoted on a stud 122. Follower rollers of said double arm cooperate with complementary cams 123 secured to the cam shaft 87. Said cams have cam portions which are effective to depress the punch operating frame so that in accordance with the differential digit positions of the punch pins 60 the card will be punched. The punching operation is effected while the punch slides are held aligned in locked position (see Fig. 7). The punch chips drop into a receptacle. After the punching operation is effected the punching frame is restored to the normal position shown in Fig. 5.

The means for effecting printing impressions from the three groups of type members 35, 36, 37 and additional type members is best shown in Figs. 2 and 3. Attached to a rock shaft 125 is a follower arm 126 carrying the usual follower roller cooperating with print cam 127 secured to cam shaft 87. Also attached to shaft 125 is an arm 128 to which a spring 129 is secured. The follower arm 126 and arm 128 have forward and downward extending arms 130 carrying a rod 131. Loosely mounted upon the rock shaft 124 are three printing platen arms 132 carrying rubber impression blocks spaced to cooperate with the three groups of type segments 35, 36 and 37. As the cam 127 is rotated in a clockwise direction (Fig. 2) the follower arm 126 and arm 128 will be rocked counterclockwise, tensioning spring 129. Since, as shown in Fig. 2, each of the printing arms 132 normally rests upon the rod 131, the former will drop downwardly following the downward movement of the rod 131. The follower arm 126 snaps at about 140° (see Fig. 7) to the lowest portion of the cam 127 under the action of the previously tensioned spring 129, thus rocking the shaft 125 counterclockwise and quickly elevating the rod 131 from its lowermost position. This rapid elevation of rod 131 snaps the rubber impression blocks against the type segments 33 to effect an impression upon the card through the usual inking ribbon. To enable the free movement of the impression blocks it is seen that the card carriage 70 has slots 133 (see Fig. 2) through which such impression blocks pass.

It is also desirable to print at points D, E, F of the card 66 (see Fig. 6) with an impression which comprises the stamp of the issuing office and to this end the additional printing arms 134 (Fig. 2) are provided. These are also loosely mounted on the rod 125 and since they also rest upon the rod 131 they are struck by such rod to snap rubber impression blocks 135 to take a printing impression from three type members 136 which carry the desired indicia. The card carriage is provided with additional openings 137 to enable the free movement of rubber impression blocks 135.

As previously stated the means for inking the type to effect the printing impression consists of the usual inking ribbon and briefly the inking ribbon is wide enough to pass underneath the type members of the type groups 35, 36 and 37 and 136 is fed from one spool 138 to another spool 139 (Fig. 3). If so desired, any suitable ink ribbon reversing mechanism may be incorporated so that a fresh portion of the inking ribbon is fed to the printing type to secure more legible printing impressions.

It is, of course, necessary to restore the three groups of printing members 35, 36, 37 and all the rack slides back to normal position, preparatory to setting up a new amount in the machine. This, in the present machine, is effected by restoring means cooperating with all the rack slides shown in Fig. 4 and through the interconnecting system previously described, resetting the three groups of type segments and the punch slides to normal position. At this time the manipulative members 25 will all be at the asterisk position.

The resetting of the three groups of slides is effected by the guide rod 27 previously referred to. Said rod 27 cooperates with elongated slots 28 in each of the three groups of slides and is guided in its reciprocating movement by similar slots 140 (see Fig. 1) in the side members 10 and 11. Said restoring rod 27 is carried by the ends of arms 141 and 142 (Fig. 3) secured to a rock shaft 143. The arm 141 (Fig. 1) has a link connection 144 to a follower arm 145 cooperating with complementary cams 146 rotatable with the main drive gear 83. The cam formations are such that at the termination of the printing impressions and the card punching operations the follower arm 145 will be rocked so that through the interconnecting link 144 arms 141 and rock shaft 143 will be rocked counterclockwise. Arms 141 and 142 will then shift bail rod 27 forwardly and the latter will cooperate with the left hand ends of the slots 28 in each of the slides, picking them up at differential times and positively restoring them and the settable manipulative devices 25 back to asterisk normal position. Of course, the three groups of type printing members 35, 36 and 37 and likewise through the interconnecting system previously described the punch slides 55 will all be brought back to normal position.

*Interlocking system*

It is desirable to incorporate in the machine an interlocking system which will insure the proper performance of the machine, such as the requirement that; a card and only one card be placed upon the punch carriage; the units order manipulative device 25 is set up to represent any digit position 0-9 or other than the asterisk position; the manipulative devices can be set up to enter amounts up to but not exceeding $100,00; the operation of the crank handle is prevented unless the card receiving carriage is in its inward punching and printing position, and the movement of the card receiving carriage out of its inward position is prevented once the operation of the crank handle has been initiated.

Figure 12:
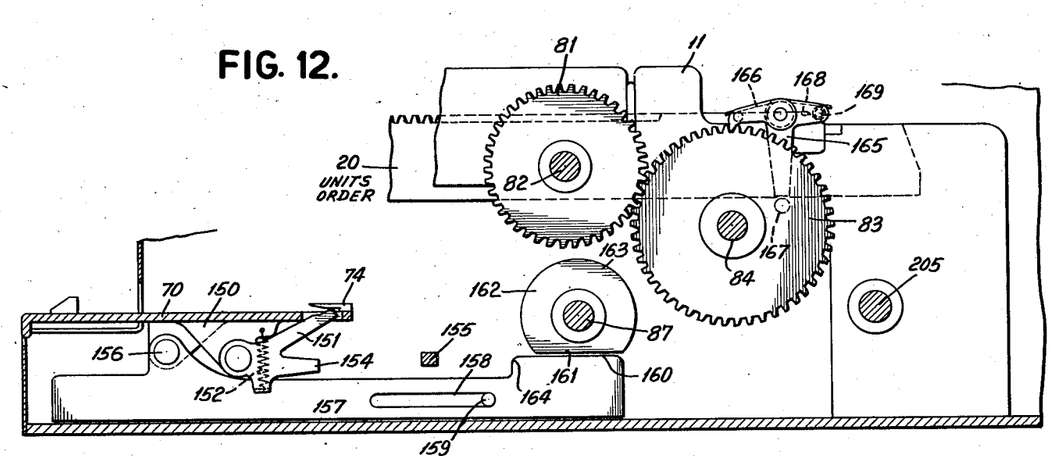
Fig. 12 is a schematic view of components of the interlocking system.

Pivotally carried by a bracket 150 (Figs. 5 and 12) attached to the underside of the card carriage 70 is a card operated lever 151 urged by a spring 152 so that the extremity of said lever projects through a slot 153 in the card carriage plate 70 to project above its upper surface. The aforementioned guide and card stop 74 is positioned over the slot 153 so that when a card is placed upon the card carriage 70 it will be guided by said guide stop 74 and its rear edge will strike the extremity of the card lever 151 to rock the same. As long as the card remains on the card carriage, said card lever 151 remains in the rocked position as shown in Fig. 5. Integral with the card lever 150 is a stop arm 154 which, in the absence of a card on the card carriage, is in the path of a fixed stud 155 as shown in Fig. 12. When a card is placed on the card carriage and has rocked the card lever 151 the stop extension 154 will be out of the path of the stud 155 and the card carriage may, therefore, be moved completely inward and in such position it operates mechanism to unlock the crank handle 80.

As mentioned in an earlier paragraph, means are also provided to prevent the operation of the machine if, by accident or intent, an attempt is made to place more than one card in the carriage 70. Referring to Figures 5 and 12, it will be seen that guide block 74 and the upper plane of carriage 70 provide a horizontal slot for reception of the rear edge of card. The rear edge of card must enter the slot sufficiently for the edge of a card to strike the end of the slot in block 74 in order to actuate card lever 151 as previously described. The width of this slot is such that one card can be inserted, but two or more cards cannot. Thus, it will be seen that since two or more cards cannot enter the horizontal portion of slot, card lever 151 will not be actuated, thus preventing operation of machine as previously described.

A locking plate 157 (Fig. 12) is connected by a stud 156 to the card carriage so as to have a similar reciprocating movement as the card carriage is moved inwardly and returned. The locking plate 157 is guided by the guide slot 158 therein receiving a guide stud 159.

In the normal outward position of the card carriage the locking edge 160 (Fig. 12) of the locking plate 157 cooperates with a straight edge 161 of a locking cam 162, secured to the cam shaft 87. The normal locking relationship between the coacting edges 160 and 161 normally locks the crank handle 80 against rotation. If the operator fails to place a card on the card carriage or places two or more cards on the carriage, the latter may be moved inwardly but since card lever 151 has not been rocked the stop arm 154 will abut the stop stud 155 and while the carriage may be moved a certain distance inwardly, a locking relationship between the edges 160 and 161 will still be maintained and the crank handle will still be locked against rotation. This will be an indication to the operator that there has been a failure to place a card upon the card carriage or he has two or more cards thereon. When only one card has been properly placed on carriage, card lever 151 will be rocked, bringing stop arm 154 out of the path of stop stud 155 and now the locking plate 157 can be moved to its extreme inward position, bringing the locking edge 160 out of locking relationship with the locking edge 161. Assuming that another lock to be subsequently described has been disabled, the crank handle 80 may now be rotated to operate the machine. During the initial rotation of the cam shaft 87 the periphery 163 of cam 162 will cooperate with the surface or edge 164 of the locking plate 157. This locking relationship is maintained during substantially the complete rotation of the cam shaft 87 to prevent the operator from restoring the card carriage outwardly until all operations of the machine have been completely performed.

An additional lock to prevent the rotation of the crank handle 80 until slide 20 has been moved to any digit position 0-9 is also shown in Figs. 4 and 12. It will be seen that pivoted on the side plate 11 is a bell crank 165 urged by a spring 166 so that its vertical arm coacts with a stud 167 attached to gear 83. The units order rack slide 20 is provided with a cam portion 168 which is in the plane of a stud 169 carried by one arm of the bell crank 165. In any digit position 0-9 of the units order slide 20 said cam portion 168 coacting with the stud 169 will rock the bell crank 165, bringing its vertical arm out of locking cooperation with the stud 167, thereby disabling this normal lock for the crank handle.

At the termination of the operation of the machine the units order slide 20 as well as the others are restored to asterisk position at which time stud 169 is out of cooperation with the cam edge 168, enabling spring 166 to again restore bell crank 165 to normal locking position cooperating with the locking stud 167.

*Interlocking system for predetermining maximum amount to be entered in the machine*

Another interlocking system is associated with the slides set by the manipulative devices 25 which prevents setting up of amounts exceeding $100.00. Such interlocking mechanism is shown in Figs. 4, 9, 10 and 11. Slidably mounted in slots in the side plates 10 and 11 is a slide bar 176 and said bar is freely movable to the right or left, depending upon its position of the adjustment effected by the slides. To limit the extent of movement of the slide bar 176, the latter is provided with a rectangular notch in which fits the tongue 178 of a plate 179 secured to the related side frame 10, 11 by a screw 180. This provides a guide for the movement of the bar 176 and further limits its extent of movement. Secured to the bar 176 are studs 181, 182, 183, 184 and 185. The studs 182, 183, 184, 185 are so positioned that when each of the slides 23, 22, 21 and 20 of the tens of dollars, dollars, tens and cents denominational order are adjusted away from the asterisk and "0" position to any of the digit positions 1-9, the extremity of the moved slide will engage the rounded portion of the related stud to shift the slide bar 176 to the left as viewed in Figs. 9 and 10, thus bringing stud 181 directly in the path of movement of the slide 24 of the hundreds of dollars denomination. Hence, it is obvious that when any of the bars 23, 22, 21 and 20 are positioned to any digit position 1-9, any subsequent positioning of the slide 24 away from the normal zero position will be prevented. Hence, any amount up to 99.99 may be set up in the machine and in any of such amount settings slide 24 will be locked by the interlocking mechanism just described.

Figure 9:
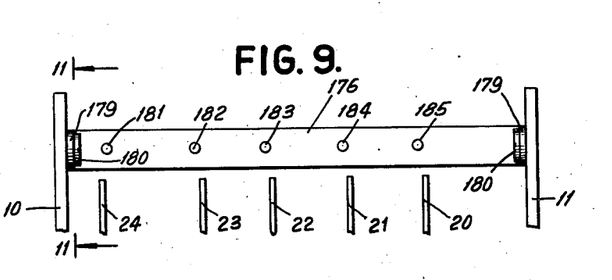
Fig. 9 is a plan view of the interlocking devices which control the magnitude of amounts which can be entered in the machine.
Figure 10:
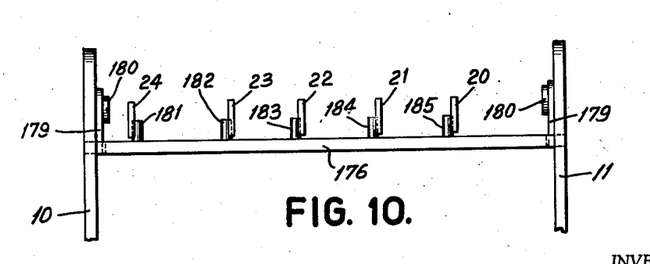
Fig. 10 is another view of such interlocking mechanism.
Figure 11:
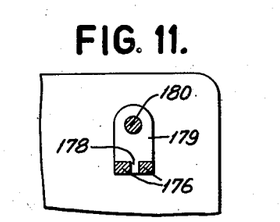
Fig. 11 is a transverse sectional view taken on the line 11—11 of Fig. 9.

Conversely when slide 24 is positioned to the 1 digit position, the extremity of the slide will engage the stud 181 to cam the slide bar 176 to the right as shown in Figs. 9 and 10 and all of the studs 182, 183, 184, 185 are now directly in the path of movement of the slides 23, 22, 21, and 20. Hence, any initial setting of the slide 24 to a 1 digit position will prevent movement of lower denominational slides away from the zero position. It is pointed out that the guide slot for the manipulative device 25 associated with the hundreds of dollars denominational order slide 24 is preferably cut so as to prevent setting of such slide beyond the 1 digit position (see Fig. 4).

The above interlocking system is simple in construction but efficiently performs its function and is provided for the purpose of preventing setting up of amounts exceeding $100.00 which is intended to be the limit amount punched and printed on the cards.

*Entry accumulator mechanism*

While not essential to the utility of the machine so far described, it is also desirable to add or accumulate the amounts entered in the machine and to this end there is provided an accumulator in which the main elements thereof are carried by a frame including frame plates 190 and 191 (see Fig. 4). The frame plate 190 is mounted for vertical reciprocating movement in the side plate 10 whereas the frame plate 191 is slidably mounted in a supplemental parallel sub-frame plate 192. The frame plates 190 and 191 carry rods 195, 196 and 197 (Fig. 2) on which are pivotally mounted the accumulator wheels 198, idler gears 199 and actuating gears 200, the latter being adapted when the accumulator frame is depressed to mesh with related actuating racks 201. From Fig. 4 it will be observed that the set of slides which are adapted to adjust the type carrier group 37 have each slidably mounted thereon in the usual manner the actuating racks 201. Each rack 201 has an independent units movement on the related slide for rotating the related accumulator wheel 198 and additional unit when units carries are to be effected. The accumulator frame is normally elevated in the position shown in Fig. 2 and cooperating with the accumulator frame is a plurality of cam arms 202 and 203 (Figs. 2 and 4). Each of said cam arms or plates has a cam slot 204 cooperating with extensions of rod 197 adapted when the cam plate is rocked counterclockwise by rocking of a shaft 205 to which the cam plates are secured to cause the downward movement of the accumulator unit to enmesh the actuating gears 200 with the differentially positioned racks 201. Secured to the rock shaft 205 is a follower bell crank arm 206 (Fig. 1) cooperating with complementary cams 207 rotatable with the main driving gear 83. Such cams are designed to enmesh the accumulator gears 200 with the differentially positioned racks 201 just prior to the time that the rack slides are restored by the restoring bar 27 (see Fig. 7). Restoration of the racks 201 back to forward position will rotate gears 200 and through idler gears 199 the accumulator wheels 198 will be rotated commensurately with the amounts set up in the machine. When such entry has been effected the cam plates 202, 203 are rocked clockwise, thereby bringing the accumulator frame to its normal elevated position. In such position the rack slides may be freely adjusted to enter the next amount in the machine.

As previously described, gear 86 completes its rotation at 306° of hand crank movement. Referring to the timing chart (Fig. 7) it will be seen that accumulator is still meshed with setup racks, and setup slides have just been completely restored to their normal asterisk position at about the time main cam shaft 87 has completed its rotation. Additional time is thus necessary to return restoring rod 27 to its normal rearward position as shown in Fig. 1, and to disengage the accumulator wheels from adding racks 201 and assume the position shown in Fig. 2. These functions are performed during the remaining 54° of movement of the hand crank movement.

The machine also includes the usual form of units carry device which comprises, in the present instance, a bell crank 208, the arm 209 thereof being engaged by the transfer pin when an accumulator order wheel goes from 9–0. The rocking of the bell crank in a counterclockwise direction will disengage the latching extension 210 from the projection 211 of the accumulator actuating rack 201 of next higher order. This will permit a movement of the rack 201 independent of the slide which carries it so as to additionally rotate the next higher order accumulator wheel a unit. Thus, units carries are effected in the well known manner.

For restoring those racks 201 which have been unlatched for transfer operations, there is provided a slidably mounted bail 212 which engages the forward ends of each of the unlatched racks 201 so that they are again latched in the position shown in Fig. 2. The upper end of each double arm 213 pivoted on a rod 214 has a pin and slot connection 215 with one side plate of the bail 212. The lower arm of one of the double arms 213 is connected to a pitman 216 having a follower roller 217 cooperating with a profile cam 218. The cam formation of said cam 218 is adapted to shift bail 212 at the initial operation of the machine so as to relatch all of the unlatched slides 201 previously utilized for transfer operations (see Fig. 7).

Latching pawls 219 (Fig. 2) latch the rocked transfer bell cranks 208. The arms 213 carry at their lower extremities a rod 220 which cooperate with tails 221 of the latching pawls 219. When bail 212 restores the unlatched racks 201 which have been used for units carry operations, rod 220 strikes the pawls 219 to rock them to unlatching position. In so doing, springs 222 connected to the transfer bell crank arms 210 rock transfer bell crank arms 210 to their latching position to relatch the actuating racks 201 in the position shown in Fig. 2.

Item counter

While not essential, it is desirable to provide the machine with an item or unit counter of the Veeder type which will count the number of operations of the crank handle. This will provide a check for the number of cards which should be punched and printed.

Mounted on a suitable bracket is a units counter 226 (Fig. 1) of the customary Veeder type. The actuating arm 227 of such units counter extends outside of the casing and has a pin and slot connection to an arm 228 attached to the rock shaft 205. As stated, for each operation of the crank handle, shaft 205 is rocked to perform its functions and will also rock the arm 228 and through the latter the actuating arm 227 of the counter so as to add a unit thereto. The units counter includes a series of digit wheels and the digit representations on the wheels are visible through a window in the cabinet of the machine.

In order to simplify the construction of the machine neither the item counter 226 nor the accumulator is capable of being reset to zero. The amounts accumulated during any period is found by subtracting the amount registered thereon at the beginning of a period from the last amount. The corresponding mathematical computation performed in connection with the units counter will also give the number of machine operations during a given period.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, the combination of a plurality of denominationally ordered slides manually positionable to selected digit positions 0–9, punches carried by said slides to effect 0–9 digit punching on record material associated with said punches, a plurality of locking means for each slide and operatively associated therewith, said locking means for each slide of lower denominational order being rendered effective to lock all slides of lower denominational order by the slide of highest denominational order when the latter is set to a 1 digit position, and conversely the locking means of the slide of higher denominational order being rendered effective to lock the slide of highest denominational order by any slide of lower denominational order when set to a 1 digit position.

2. In a machine of the class described, the combination of a plurality of denominationally ordered slides manually positionable to selected digit positions 0–9, punches carried by said slides to effect 0–9 digit punching on record material associated with said punches, a bar carrying a plurality of locking studs, each engaged by a related slide to move said bar, the locking stud associated with the slide of highest denominational order being moved to locking position by the movement of the bar effected by the cooperation of any slide of lower denominational orders with its related stud, and a plurality of studs associated with the slides of lower denominational orders being moved to locking position by the movement of the bar effected by the cooperation of the slide of highest denominational order with its related stud.

3. In a machine of the class described, the combination of a plurality of denominationally ordered slides manually positioned to selected digit positions 0–9, punches carried by said slides to effect 0–9 digit punching on record material associated with said punches, and interlocking means associated with the slide of highest denominational order and the slide of each lower denominational order to prevent the setting of any of said slides of lower denominational order to any digit position other than 0 when the slide of highest denominational order is set to represent the 1 digit position.

4. In a machine of the class described, the combination of a plurality of denominationally ordered slides manually positioned to selected digit positions 0–9, punches carried by said slides to effect 0–9 digit punching on record material associated with said punches, and interlocking means associated with the slide of highest denominational order and the slide of each lower denominational order to prevent the setting of any of said slides of lower denominational order to any digit position other than 0 when the slide of highest denominational order is set to represent the 1 digit position, and conversely to prevent the setting of the slide of highest denominational order to the 1 digit position when any of the slides of lower denominational order is set to a digit position greater than 0.

5. An interlocking system for a plurality of slides comprising a bar, a plurality of studs carried by said bar, each normally engaged by a related slide to shift said bar to lock only one slide by the cooperation of a supplemental stud with that slide, said supplemental stud being carried by said bar and so positioned that when the related slide is moved its engagement with said supplemental stud shifts the bar and said plurality of studs to locking position for all of the remaining slides.

6. A machine of the class described comprising a series of punching elements, a card carriage manually positionable from a card receiving position to a card punching position associated with said punching elements, a lock member carried by said carriage and shiftable by the card manually placed on the carriage to release the carriage for manual positioning to punching position, a main operating means operated to actuate said punching elements, a shiftable member connected to said card carriage, and interlock means associated with said operating means and said member to prevent the operation of the operating means unless said carriage is in card punching position, and to prevent the movement of said carriage away from card punching position once the operation of said operating means is effected.

7. A machine of the class described comprising a series of punching elements, a card carriage manually positionable from a card receiving position to a card punching position associated with said punching elements, a lock member carried by said carriage and shiftable by the card manually placed on the carriage to release the carriage for manual positioning to the punching position, a main operating means operated to actuate said punching elements, said main operating means including a cam having a locking surface, a shiftable member having a surface normally cooperating with the cam locking surface to normally lock said operating means, and means to connect said card carriage and said shiftable member to cause said member to be shifted to a position disassociating said cooperating locking surfaces to unlock said operating means when said carriage is released for manual positioning to the punching position.

8. A machine of the class described, comprising a series of punching elements, a card carriage manually positionable from a card receiving position to a card punching position associated with said punching elements, a lock member carried by said carriage and shiftable by the card manually placed on the carriage to release the carriage for manual positioning, a main operating means operated to actuate said punching elements, said main operating means including a rotatable cam having a locking surface and a supplemental locking surface, a shiftable member having a surface normally cooperating with the cam locking surface to normally lock said operating means, means to connect said card carriage and said member to shift said member to a position disassociating said cooperating locking surfaces to unlock said operating means and said cam for rotation when said carriage is moved to card punching position, said supplemental locking surface of said cam locking said member to lock said carriage in card punching position by the rotation of said cam effected during the operation of said operating means.

9. A machine of the class described, comprising a series of punching elements, a card carriage manually positionable from a card receiving position to a card punching position associated with said punching elements, a lock member carried by said carriage and shiftable by the card manually placed on the carriage to release the card carriage for manual positioning, a main operating means operated to actuate said punching elements, said main operating means including a rotatable locking cam, a shiftable member connected to said card carriage, and interlock means associated with said locking cam and said member to prevent the operation of said operating means unless said carriage is in card punching position, and to prevent the movement of said carriage away from card punching position once the operation of said operating means is effected.

10. In a card punching machine, in combination, a plurality of denominationally ordered devices, selected devices being settable prior to an operation of the machine to determine the amount to be punched, a plurality of punch pin carrying bars settable under control of said settable devices, comprising for each bar a single punch pin and correlated die aperture oppositely disposed of a closed card receiving slot in said bar, an operating means for said machine including a normally locked manipulative device, a carriage movable inwardly of the machine to correlate a card thereon to said punching pins, a card lever on said carriage and including a lock member actuated thereby, an abutment cooperating with said lock member to prevent complete inward movement of said carriage to punching position without operation of said card lever due to the absence of a card on said carriage, and means for normally locking said manipulative device including means shiftable for said carriage, said last named means being shiftable to unlocking position when said carriage is moved completely inward of the machine.

11. In a card punching machine, in combination, a plurality of denominationally ordered devices, selected devices being settable prior to an operation of the machine to digit positions 1–9, a plurality of punch pin carrying bars settable under control of said settable devices, comprising for each bar a single punch pin and correlated die aperture oppositely disposed of a closed card receiving slot in said bar, an operating means for said machine including a normally locked manipulative device, locking means for said manipulative device, and means controlled by only one of said devices for disabling said locking means when said device is positioned to any of the digit positions 1–9.

12. In a card punching machine, in combination, a plurality of denominationally ordered devices, said devices being settable prior to an operation of the machine to determine the amount to be punched, a plurality of punch pin carrying bars differentially settable under control of said settable devices, comprising for each bar a single punch pin and correlated die aperture oppositely disposed of a closed card receiving slot in said bar, a card carriage having means for carrying a card having vertical denominationally ordered columns, each of which contains the different index point positions, means for guiding said carriage in the machine to enable its manual insertion in the machine in the direction of said card columns to effect the correlation of said columns with the differentially positioned punch pins, means to actuate the punch pins, blocking means to prevent manual insertion of said card carriage, and means comprising a card lever actuated by a card on the carriage to disable said blocking means.

13. In a card punching machine, in combination, a plurality of denominationally ordered devices, said devices being settable prior to an operation of the machine to determine the amount to be punched, a plurality of punch pin carrying bars differentially settable under control of said settable devices, comprising for each bar a single punch pin and correlated die aperture oppositely disposed of a closed card receiving slot in said bar, a movable card carriage having means for carrying a card having vertical (as the card is customarily viewed for interpretation) denominationally ordered digit representing columns, each of which contains the different index point positions, means for guiding said carriage in the machine to enable its manual insertion in the machine in the direction of said digit representing card columns to effect the correlation of said columns with the differentially positioned punch pins, and means to actuate the punch pins.

RALPH E. PAGE.